(12) United States Patent
Karthikeyani et al.

(10) Patent No.: US 10,787,613 B2
(45) Date of Patent: Sep. 29, 2020

(54) CATALYST ADDITIVE COMPOSITION FOR REDUCTION OF SULFUR IN GASOLINE

(71) Applicant: INDIAN OIL CORPORATION LIMITED, Mumbai (IN)

(72) Inventors: Arumugam Velayutham Karthikeyani, Faridabad (IN); Kumaresan Loganathan, Faridabad (IN); Alex Cheru Pulikottil, Faridabad (IN); Balaiah Swamy, Faridabad (IN); Madhusudan Sau, Faridabad (IN); Sanjiv Kumar Mazumdar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 0 days.

(21) Appl. No.: 16/299,002

(22) Filed: Mar. 11, 2019

(65) Prior Publication Data
US 2019/0276749 A1 Sep. 12, 2019

(30) Foreign Application Priority Data
Mar. 9, 2018 (IN) .............................. 201821008814

(51) Int. Cl.
| | | |
|---|---|---|
| *B01J 21/04* | (2006.01) | |
| *B01J 23/72* | (2006.01) | |
| *B01J 37/04* | (2006.01) | |
| *B01J 37/08* | (2006.01) | |
| *C10G 11/04* | (2006.01) | |
| *B01J 35/10* | (2006.01) | |
| *B01J 37/00* | (2006.01) | |
| *C10G 55/06* | (2006.01) | |
| *B01J 23/00* | (2006.01) | |

(52) U.S. Cl.
CPC .............. *C10G 11/04* (2013.01); *B01J 21/04* (2013.01); *B01J 23/005* (2013.01); *B01J 23/72* (2013.01); *B01J 35/1014* (2013.01); *B01J 35/1061* (2013.01); *B01J 37/0045* (2013.01); *B01J 37/08* (2013.01); *C10G 55/06* (2013.01); *B01J 2523/17* (2013.01); *B01J 2523/31* (2013.01); *C10G 2300/104* (2013.01); *C10G 2300/1055* (2013.01); *C10G 2300/202* (2013.01); *C10G 2300/305* (2013.01)

(58) Field of Classification Search
CPC . B01J 21/04; B01J 23/005; B01J 23/72; B01J 35/1014; B01J 35/1061; B01J 37/0027; B01J 37/0045; B01J 37/04; B01J 37/08
See application file for complete search history.

(56) References Cited

U.S. PATENT DOCUMENTS

| | | |
|---|---|---|
| 4,957,892 A | 9/1990 | Yoo et al. |
| 5,990,030 A | 11/1999 | McCauley |
| 6,379,536 B1 | 4/2002 | Peters et al. |
| 7,033,487 B2 | 4/2006 | O'Connor et al. |
| 7,347,929 B2 | 3/2008 | Vierheilig et al. |
| 8,409,428 B2 | 4/2013 | Dean et al. |
| 9,403,155 B2 | 8/2016 | Dean et al. |

OTHER PUBLICATIONS

A. V. Karthikeyani et al., In Situ FCC Gasoline Sulfur Reduction Using Spinel Based Additives, 42 Int. J. Hydrogen Energy 26529-26544 (2017).*
Mitchell, R.B., "Metal Contamination of Cracking Catalysts. 1. Synthetic Metals Deposition on Fresh Catalysts," Industrial & Engineering Chemistry Product Research and Development, vol. 19, Issue 2, pp. 209-213 ( Jun. 1980).

* cited by examiner

*Primary Examiner* — Randy Boyer
(74) *Attorney, Agent, or Firm* — Maschoff Brennan

(57) ABSTRACT

The present invention relates to an improved $CuAl_2O_4$ spinel based catalyst additive composition having bi-modal pore size for improving gasoline sulfur removal activity by maintaining high gasoline selectivity and maintaining research octane number (RON) while cracking heavier hydrocarbon feedstocks in the fluid catalytic cracking unit. More particularly, present invention relates to a gasoline sulfur reduction (GSR) additive comprising copper aluminate spinel, acidic alumina matrix; and clay, wherein the additive having bimodal pore distribution. Present invention also relates to a process for preparing the gasoline sulfur reduction (GSR) additive.

12 Claims, 4 Drawing Sheets

CATALYST ADDITIVE COMPOSITION FOR REDUCTION OF SULFUR IN GASOLINE

FIELD OF THE INVENTION

This invention relates to an improved spinel based catalyst additive composition having bi-modal pore size for improving gasoline sulfur removal activity by maintaining high gasoline selectivity and research octane number (RON) while cracking heavier hydrocarbon feedstocks in the fluid catalytic cracking unit. More particularly, present invention relates to a gasoline sulfur reduction (GSR) additive comprising copper aluminate spinel, acidic alumina matrix and clay, wherein the additive having bimodal pore distribution.

BACKGROUND OF THE INVENTION

Environmentally driven regulations throughout the world demand dramatic improvements in the quality of transportation fuels gasoline and diesel. The exhaust gases from motor vehicles contribute to a large extent to air pollution through their NOx and SOx content. Sulfur in gasoline and diesel fuels not only contribute directly to SOx emission but also poison catalytic converter in automobiles. Therefore, the refining industry is under constant environmental pressure to achieve more rigorous standards on sulfur content in fuel used in transportation sector. In India, BS VI standards will go into effect for all vehicles on or after Apr. 1, 2020 and the new gasoline specification requires sulfur, aromatics and research octane number (RON) content to be 10 ppm (maximum), 35 vol % and 91 (minimum) respectively. In the refinery, commercial gasoline pool is made up of different fractions coming from reforming, isomerization and fluid catalytic cracking (FCC). The gasoline from FCC makes up about 30-35 vol % of gasoline blend stocks/pool, and at the same time accounts for over 90% of the sulfur (90-98%) and olefins in the entire gasoline pool. Therefore, desulfurization of FCC gasoline without sacrificing research octane number (RON) is very important to make it acceptable for various applications.

Various approaches are available to reduce sulfur content in FCC gasoline, which includes (i) reducing the end point of the gasoline stream, but this will add sulfur in the light cycle oil (LCO) stream and can be removed by LCO hydrotreater, (ii) pre-treating the FCC feed to remove sulfur through catalytic feed hydrotreater (CFHT), but the disadvantage of FCC feed hydrotreatment is its high operating and capital costs, (iii) post-treatment of the gasoline product leads to a significant loss of octane number and yield. The other disadvantages of post treating process are its high hydrogen consumption, investment and operating costs, (iv) processing of relatively light and low-sulfur crude oil, which can force the refiner into purchasing more expensive feeds and (v) use of FCC catalyst additives.

Sulfur reduction by use of additive along with base catalyst inside the FCC unit offers economic advantages over the pre-treatment and post-treatment processes. It is evident that in the gasoline post-treatment processes, the reduction of sulfur from the high sulfur content gasoline feed leads to a big loss of RON. Therefore, the acceptable sulfur content in the feed (with and without recycle gasoline) for the post treatment processes that come from FCC unit should not cross the range of 60-300 ppm, which can be achieved by the use of gasoline sulfur reduction additives in FCC unit, as it does not require additional process and capital cost.

Spinels $MAl_2O_4$ ($M^{2+}$ metal ion) are widely used as catalysts or catalyst supports for different applications due to their high acidity, good chemical stability, melting points and mechanical strength. In the FCC field, these additives have been used for reducing SOx emission during regeneration of FCC catalyst and reducing the sulfur level of cracked products such as gasoline fuel. Other additives tested to assess their effectiveness in reducing sulfur species in gasoline include Zn/alumina, Ti/alumina and Ga/alumina, Ni, Cu, Zn, and Ag aluminates, V/alumina and Zn—Mg spinels, were studied by different authors. The literature information also indicated that the commercial industry data by using gasoline sulfur reduction (GSR) additive demonstrated that the degree of sulfur reduction is limited, not more than 20-30 wt %.

U.S. Pat. Nos. 9,403,155 and 8,409,428 disclose a novel additive composition for reducing sulfur content of a catalytically cracked gasoline fraction. This additive composition comprises a support consisting of porous clay into which a first metal from group IVB is incorporated and a second metal from group IIB is impregnated. Preferably, the first incorporated metal is zirconium and the second impregnated metal is zinc. The sulfur reduction additive is used in the form of a separate particle in combination with a conventional cracking catalyst in a fluidized catalytic cracking process to convert hydrocarbon feedstocks into gasoline having comparatively lower sulfur content and other liquid products.

U.S. Pat. No. 7,347,929 discloses novel methods for reducing sulfur in gasoline with hydrotalcite like compound additives, calcined hydrotalcite like compounds, and/or mixed metal oxide solution. The additives can optionally further comprise one or more metallic oxidants and/or supports. U.S. Pat. No. 7,347,929 is also directed to methods for reducing gasoline sulfur comprising contacting a catalytic cracking feedstock with a mixed metal oxide compound comprising magnesium and aluminum and having X-ray diffraction pattern displaying a reaction at least at a two theta peak position at about 43 degrees and about 62 degrees, wherein the ratio of magnesium to aluminum in the compound is from about 1:1 to about 10:1.

U.S. Pat. No. 7,033,487 discloses a catalyst composition comprising about 5-55 wt % metal doped anionic clay, about 10-50 wt % zeolite, about 5-40 wt % matrix alumina, about 0-10 wt % silica, about 0-10 wt % of other ingredients, and balance kaolin. In metal-doped anionic clays, the additive, i.e. the metal dopant, is distributed more homogeneously within the anionic clay than in impregnated anionic clays, without Separate phases of additive being present. Hence, abrasion of this catalyst composition will result in microfines poorer in additive than the prior art composition. Furthermore, the catalyst composition according to U.S. Pat. No. 7,033,487 results in a higher reduction of sulfur in fuels such as gasoline and diesel than is the case in composition comprising impregnated anionic clay.

U.S. Pat. No. 6,379,536 discloses a composition comprising a component containing (i) an acidic oxide support, (ii) an alkali metal and/or alkaline earth metal or mixtures thereof, (iii) a transition metal oxide having oxygen storage capability, and (iv) a transition metal selected from groups Ib and/or IIb of the periodic table provide NOx control performance in FCC processes. The acidic oxide support preferable contains silica alumina. Ceria is the preferred oxygen storage oxide. Cu and Ag are preferred group I/II b transition metals. The compositions are especially useful in the cracking of hydrocarbon feedstocks having above average nitrogen content. U.S. Pat. No. 5,990,030 discloses that sulfur oxides are removed in the regenerator zone and rapidly released as $H_2S$ in the reactor zone of an FCC system employing a particulate SOx reducing additive comprising an alkali metal oxide. Embodiments comprise the incorporation of an inorganic support, MgO, $Ce_2O$ or Ag and $V_2O_5$.

U.S. Pat. No. 4,957,892 discloses an improved process for converting hydrocarbons using a catalyst which is periodically regenerated to remove carbonaceous deposits, the catalyst being comprised of a mixture containing, as a major component, solid particles capable of promoting hydrocarbon conversion at hydrocarbon conversion conditions, and, as a minor component, discrete entities comprising at least one spinel, preferable alkaline earth metal-containing spinel; thereby reducing the amount of sulfur oxides exiting the catalyst regeneration zone. Improved hydrocarbon conversion catalysts are also disclosed.

SUMMARY OF THE INVENTION

Fluid catalytic cracking (FCC) is one of the most important conversion processes used in petroleum refineries. It is widely used to convert the high-boiling, high-molecular weight hydrocarbon fractions of petroleum crude oils (feedstock) into more valuable products such as dry gas, LPG, gasoline, heavy naphtha, light cycle oil and clarified oil. In FCC unit, the sulfur present in the feedstock is typically converted to $H_2S$ (35-45%) and also ends up in gasoline 2-10%, in coke 2-5% and the rest ends up in the light cycle oil (LCO) and bottoms. Most of the sulfur species found in the product gasoline are formed during cracking; they are not present initially in the feedstock. Primarily the sulfur containing feedstock catalytically crack to more valuable products and less difficult sulfur compounds due to the presence of Y-zeolite and selective matrix components. A secondary effect is due to the active matrix sites of FCC catalyst, which allow cracking of sulfur compounds themselves, which are originally present in the fresh feedstock or products. Therefore, the sulfur species formation can be altered (or) controlled based on the amount of matrix present in catalyst system. The sulfur removed is released as $H_2S$ along with dry gas. The sulfur ended up in the gasoline can be reduced by using gasoline sulfur reduction (GSR) additive in the FCC unit at 10-25 wt % concentration and the remaining 90-75 wt % is base catalyst. Further, if the additive concentration is increased to beyond 25 wt. %, the main base catalyst activity will be dropped due to dilution effect. The recombination of formed $H_2S$ from the decomposition of the sulfur compounds present in the feedstock to the olefins and diolefins formed from the cracking reaction has to be controlled (or) minimized as the olefin saturation reduces the octane number of the gasoline. The spinel based additive system reduces the recombination reaction, as the additive with transition metal ions exhibit high dehydrogenation activity (low Hydrogen Transfer Function (HTF)) and can promote the formation of light alkenes in the FCC process.

Further if the heaviness of the FCC feedstock increases the nickel, vanadium and sulfur content of the feedstock will also increases. The nickel and vanadium of the feedstock deposits on catalyst particles during the cracking reactions in the reactor and in the regenerator this vanadium converts into vanadium oxides and further it converts into vanadic acid and reduces the activity of the main FCC catalyst. Therefore, the present invention aim to prepare a $CuAl_2O_4$ spinel based additive system having Bi-model pore for reducing sulfur in the gasoline produced as well as to improve metal tolerance of the main catalyst in the fluid catalytic cracking unit by cracking heavy hydrocarbon molecule.

According to IUPAC definition, the materials are classified based into three types of pore size. Material having pore size<2 nm (20 Å) is microporous materials. Material having pore size 2-50 nm (20-500 Å) is mesoporous materials. Material having pore size>50 nm is macroporous materials.

Present invention discloses a formation/creation of two mesoporous pore size range (i.e. 20-200 Å and >200-400 Å) in the additive formulation by using large pore acidic alumina matrix, copper aluminate spinel and clay.

Matrix with large pore size acidic matrix component is important for cracking of higher boiling and larger hydrocarbon feed stocks/molecules with molecular dimension>200 Å.

In VGO feed, sulfur compounds are present in bigger size molecules and therefore, to avoid diffusion limitation large pore size is required to adsorb and crack larger hydrocarbon molecules into smaller molecules. After cracking into smaller molecules, the acidic matrix (active site) present in the additive having pore size in the range of 20-200 Å will activate/alter the sulfur reaction path in the product streams such as LPG, Gasoline with good octane number, heavy naphtha, light cycle oil, clarified oil and coke.

The large pore size acidic matrix component (>200 Å) present in the additive of current invention provides bottom cracking activity (i.e. reduction in clarified oil yield (unconverted portion after reaction)). The acidic matrix component having pore size in the range of 20-200 Å present in the additive of current invention also provides metal trap functionality.

Present invention relates to an additive composition comprises large pore alumina/acidic alumina matrix (20-40 wt %), copper aluminate spinel (10-30 wt %) and clay (40-60 wt %) has bi-model pores that is 55-75% of large pore size acidic matrix (>200 Å) and 25-45% mesoporous pore size (20-200 Å) to crack nickel and vanadium containing heavier hydrocarbon molecules & to reduce sulfur in the product streams such as gasoline, heavy naphtha, light cycle oil and clarified oil. The prepared additive composition does not compromise research octane number of the product gasoline.

Large pore acidic matrix (Selective matrix component) is usually resistant to deactivation by V, but in combination with Ni and a high surface area matrix, an effective dehydrogenation catalyst can be formed. The nickel present in heavy hydrocarbon feedstocks under reactor conditions interact with components of "Y-zeolite based catalyst" and "gasoline sulfur reduction additive" and form $NiAl_2O_4$ surface species. Under FCC reactor conditions, nickel is present in reduced state and acts as a dehydrogenation catalyst producing high yields of hydrogen and coke. The extent of dehydrogenation depends upon the nickel content, the age of the nickel and cracking catalyst type. Therefore this helps in reduce the sulfur in gasoline.

Further, in this current invention the optimal amount and type of large pore acidic matrix is selected to provide adequate resistance to deactivation by metals. Large pore acidic component present in the additive is an "active alumina matrix", which provides activity sites in larger pores which allow entry for larger heavy hydrocarbon molecules and which enable the cracking of higher-boiling and larger feedstock molecules. The "active alumina matrices" present in the spinel based "GSR additive" of the present invention also serve as a metal trap component and bottom cracking activity other than gasoline sulfur removal functionality.

The above are the limitations of the discussed prior art and the current invention overcomes the aforesaid limitations:
1. Bi-model pore $CuAl_2O_4$ spinel based additive has not been studied for gasoline sulfur reduction in the FCC unit.
2. Metal tolerance capability along with gasoline sulfur reduction additive has not been addressed in the prior art.
3. Olefin content and high octane number of gasoline could be maintained along with sulfur removal activity due to high average pore.

OBJECTIVES OF THE INVENTION

The main object of the present invention is to provide an improved $CuAl_2O_4$ spinel based catalyst additive composition having bi-model pore size for improving gasoline sulfur removal activity by maintaining high gasoline selectivity and research octane number (RON) while cracking heavier hydrocarbon feedstocks in the fluid catalytic cracking unit.

Another object of the invention, in particular, relates to an additive composition comprises an active copper aluminate spinel support prepared by co-precipitation method and formed as an additive by incorporating large pore alumina and filler clay.

Still another object of the invention is to provide catalyst additive composition comprising about copper aluminate spinel (10-30%), large pore alumina (20-40%) and Clay (40-60%).

Still another object of the invention is to provide an additive composition which possesses bi-model pore size distribution characteristics.

DETAILED DESCRIPTION OF THE INVENTION

Figure 1:
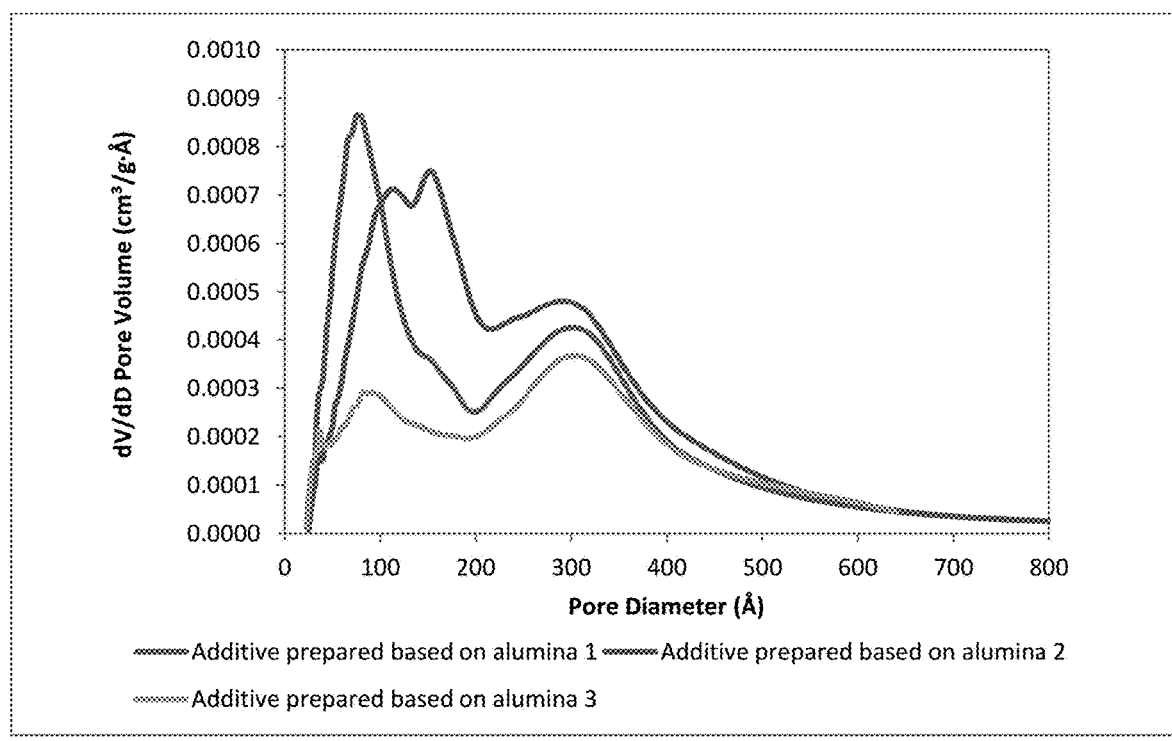
FIG. 1 illustrates Pore size distribution of additive.

Accordingly, present invention provides a gasoline sulfur reduction (GSR) additive comprising:
10-30 wt. % of copper aluminate spinel;
20-40 wt. % of acidic alumina matrix; and
40-60 wt. % of clay, and the wt. % being based on the total weight of the additive,
wherein the additive having bimodal pore distribution with 55-75% of total pore is large pore diameter in the range of >200 to 400 Å and 25-45% of total pore is mesoporous pore diameter in the range of 20-200 Å.

In one of the feature of the present invention, the copper aluminate spinel is having surface area in the range of 30-85 $m^2/gm$ and total acidity in the range of 0.121-0.232 mmol/gm.

In another feature of the present invention, the acidic alumina is having surface area in the range of 34-380 $m^2/gm$, total acidity in the range of 0.093-0.348 mmol/gm and pore volume in the range of 0.19-0.82 $cm^3/gm$.

In yet another feature of the present invention, the clay is selected from kaolinite, bentonite, illite, vermiculite, smectite, dolomite, or combination thereof.

In still another feature of the present invention, the additive is having total acidity in the range of 0.171-0.432 mmol/gm, surface area in the range of 26 to 43 $m^2/gm$, pore volume in the range of 0.15 to 0.24 $cm^3/gm$ and ABD is in the range of 0.74 to 0.84 $gm/cm^3$.

In yet another feature of the present invention, the additive is used in a fluid catalytic cracking (FCC) unit at 10-25 wt % concentration and the remaining 90-75 wt % is a base catalyst.

In yet another feature of the present invention, the additive gives gasoline product having RON in the range of 91.2-92.1 and gasoline produce sulphur reduction in the range of 24-33 wt %.

Present invention also provides a process for preparing the gasoline sulfur reduction (GSR) additive comprising:
i. milling 20-40 wt. % of alumina and 40-60 wt. % of clay to obtain a clay-alumina slurry;
ii. peptizing the clay-alumina slurry with an acid to obtain a peptized clay-alumina slurry;
iii. adding 10-30 wt. % of copper aluminate spinel to the peptized clay-alumina slurry and stirring the same for homogenization to obtain final slurry;
iv. spray drying the final slurry of step (iii) to obtain microspheres having 20-300 micron particle with ABD>0.74 gm/cc; and
v. calcining the obtained microsphere to obtain the gasoline sulfur reduction (GSR) additive.

In one of the feature of the present invention, in the above process the acid is selected from formic acid and nitric acid.

In another feature of the present invention, the copper aluminate spinel of step (iii) is prepared by co-precipitation method by sequential addition or simultaneous addition.

In yet another feature of the present invention, the pH of the final slurry step (iii) is in the range of 3-4.

In yet another feature of the present invention, the spray drying of step (iv) is carried out with inlet temperature 300-400° C., out let temperature 150-200° C., the microsphere having dimension of 45-300μ.

In still another feature of the present invention, the alumina used in the above process is having pore size in the range of 20 to 400 Å.

In yet another feature of the present invention, the copper aluminate spinel used in the above process is having pore size in the range of 30 to 60 Å.

Feedstocks:

Feed stock for the present invention includes a wide range of heavy as well as hydrocarbon fractions starting from fractions such as vacuum gas oil, hydro treated vacuum gas oil, once through hydro cracker unit bottom, short residue and their mixtures, etc. The preferred types of feed stocks used in this invention are the residual fractions having metals (Ni+V) up to a value of 28.43 ppm. Table 1 gives the properties of feed stock used in this invention.

TABLE 1

Feed properties

| Attribute | Units | Feed-1 30% OHCUB & 70% HVGO | Feed-2 80% VGO & 20% Short Residue |
|---|---|---|---|
| Density, @ 15° C. | G/cc | 0.8937 | 0.9391 |
| Kin Viscosity @ 100° C. | CST | 22.4 @ 50° C. CST | 12.69 |
| Sulphur | Wt % | 0.5 | 3.59 |
| CCR | Wt % | 0.2 | 4.06 |
| Total $N_2$ | ppmw | 1150 | 1294 |
| Na | ppmw | <1 | 0.38 |
| Fe | ppmw | <1 | 0.72 |
| V | ppmw | <1 | 21.53 |
| Ni | ppmw | <1 | 6.9 |
| PNA, wt % | | | |
| Aromatics | | | 45.2 |
| Saturates | | | 54.8 |
| CA- % Aromatic Ring Carbons | | | 23.02 |
| CP- % Paraffinic Ring Carbons | | | 58.34 |
| CN- % Naphthenic Ring Carbons | | | 18.64 |

Synthesis of Copper Aluminate Spinel ($CuAl_2O_4$):

Additive system employed in this invention includes three types of components in varied quantity, namely, copper aluminate spinel, large pore acidic alumina matrix and clay. First the copper aluminate is prepared by co-precipitation method by sequential addition and simultaneous addition.

Example 1

Batch 1:

Copper aluminate spinel was synthesized by co-precipitation method using copper (II) nitrate hexahydrate as source of copper and sodium aluminate as source of aluminium. 241.6 g of copper (II) nitrate hexahydrate, 10 g of concentrate nitric acid (68%) and 5000 g of DM water were mixed uniformly (Solution-A). In another beaker, 185 g sodium aluminate and 2000 g of DM water were stirred thoroughly to obtain clear solution of B. The solution-B was added into solution-A at constant flow rate by employing peristaltic pump at half an hour of addition time. During the addition of solution B into solution A, pH of the slurry was monitored by using Metrohm digital pH meter. Final pH of the slurry was 11 and reaction temperature is 40° C. After the precipitation was completed, the stirring was continued for 1 hour to obtain uniform mixing and to complete the hydrolysis. After 1 h, entire slurry was filtered out and washed repeatedly with hot water to obtain the material without sodium ion as impurities. The material was dried at 120° C. for overnight, and calcined at 850° C. and 1000° C. for 2 h. The synthesized material is designated as copper aluminate $CuAl_2O_4$. The XRD pattern of the sample calcined at 850° C. shows mixed CuO and $CuAl_2O_4$ (41%) and the sample calcined at 1000° C. shows 90% $CuAl_2O_4$ spinel.

Figure 4:
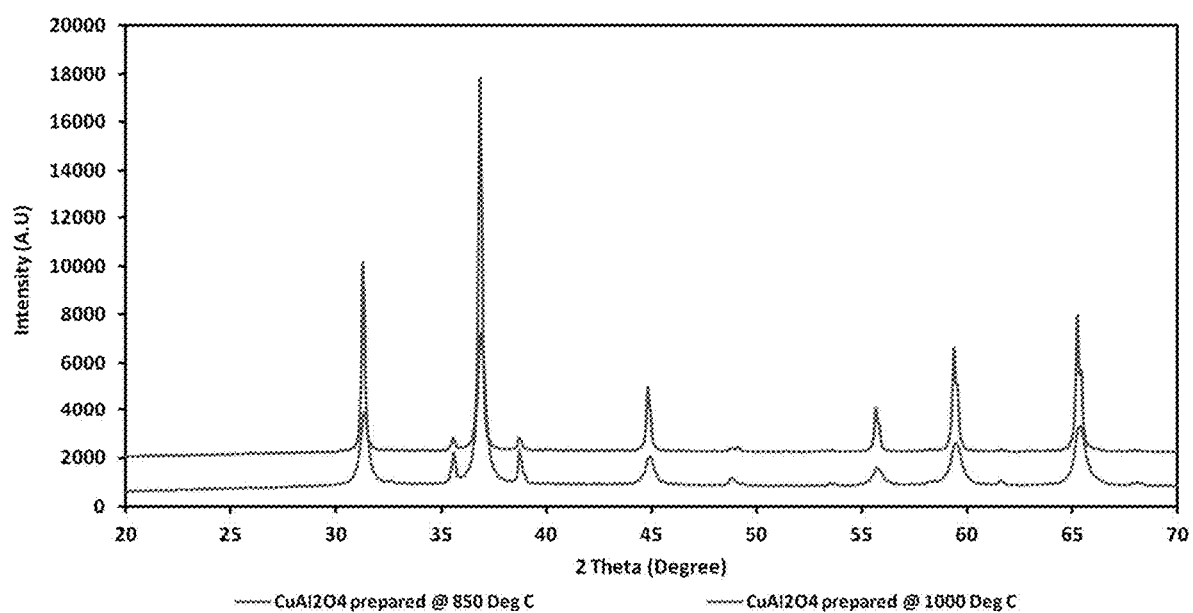
FIG. 4 XRD pattern of Copper aluminate calcined at 850° C. and 1000° C.

Batch 2:

Copper aluminate spinel was synthesized by co-precipitation method using copper (II) nitrate hexahydrate as source of copper and sodium aluminate as source of aluminium. 241.6 g of copper (II) nitrate hexahydrate, 10 g of concentrate nitric acid (68%) and 5000 g of DM water were mixed uniformly (Solution-A). In another beaker, 185 g sodium aluminate and 2000 g of DM water were stirred thoroughly to obtain clear solution of B. The solution-A and solution-B were simultaneously mixed at constant flow rate by employing peristaltic pump at half an hour of addition time. During the simultaneous addition, pH of the slurry was monitored by using Metrohm digital pH meter. Final pH of the slurry was 11 and reaction temperature is 40° C. After the precipitation was completed, the stirring was continued for 1 hour to obtain uniform mixing and to complete the hydrolysis. After 1 h, entire slurry was filtered out and washed repeatedly with hot water to obtain the material without sodium ion as impurities. The material was dried at 120° C. for overnight, and calcined at 850° C. and 1000° C. for 2 h. The synthesized material is designated as copper aluminate $CuAl_2O_4$. The XRD pattern (FIG. 4) of the sample calcined at 850° C. shows mixed CuO and $CuAl_2O_4$ (48%) and the sample calcined at 1000° C. shows 98% $CuAl_2O_4$ spinel.

The XRD pattern of copper aluminate confirms the formation of copper aluminate along with copper oxide. Upon increasing calcination temperature, copper oxide present in the surface reacting with free available alumina and forming copper aluminate spinel. Hence, the formation of spinel lattice confirming increase of intensity at 31.3, 36.86, 44.8, 55.7, 59.4 and 62.2 degree (2θ) and decreasing the copper oxide peaks.

Batch 3:

Copper aluminate spinel was synthesized by co-precipitation method using copper (II) nitrate hexahydrate as source of copper and aluminium sulphate hexadecahydrate as source of aluminium. Sodium hydroxide is used as hydrolyzing agent. 241.6 g of copper (II) nitrate hexahydrate, 630 g of aluminium sulphate hexadecahydrate and 5000 g of DM water were mixed uniformly (Solution-A). In another beaker, 320 g of sodium hydroxide and 2000 g of DM water were stirred thoroughly to obtain clear solution of B. The solution-B and solution-A were simultaneously mixed at constant flow rate by employing peristaltic pump at half an hour of addition time. During the simultaneous addition, pH of the slurry was monitored by using Metrohm digital pH meter. Final pH of the slurry was 11 and reaction temperature is 40° C. After the precipitation was completed, the stirring was continued for 1 hour to obtain uniform mixing and to complete the hydrolysis. After 1 h, entire slurry was filtered out and washed repeatedly with hot water to obtain the material without sodium ion as impurities. The material was dried at 120° C. for overnight, and calcined at 850° C. and 1000° C. for 2 h. The synthesized material is designated as copper aluminate $CuAl_2O_4$. The XRD pattern of the sample calcined at 850° C. shows mixed CuO and $CuAl_2O_4$ (43%) and the sample calcined at 1000° C. shows 95% $CuAl_2O_4$ spinel.

The prepared copper aluminate support shows surface area in the range of 30-85 $m^2$/gm and total acidity in the range of 0.121-0.232 mmol/gm. The Batch 2 sample having high acidity (0.232 mmol/gm) and moderate surface area is used for preparing the gasoline sulfur reduction additive.

Table 2 lists the preparation method and the properties of prepared copper aluminate spinel.

TABLE 2

Synthesis of Copper Aluminate Spinel (CuAl$_2$O$_4$) and its properties:

| Batch | Preparation | Calcination temperature, °C. | End pH | XRD (% of spinel phase) | SA (m$^2$/g) | Total Acidity mmol/gm |
|---|---|---|---|---|---|---|
| 1 | Source: CuN + NaAl (+HNO$_3$) Method: Precipitation method, Sequential, RT 40° C. | 850 | 11 | Mixed CuO and CuAl$_2$O$_4$ (41%) | 85 | 0.166 |
| 2 | Source: CuN + NaAl (+HNO$_3$) Method: Precipitation method, Simultaneous, RT 40° C. | 850 | 11 | Mixed CuO and CuAl$_2$O$_4$ (48%) | 54 | 0.232 |
| 3 | Source: CuN + AlS + NaOH Method: Precipitation method Simultaneous, RT 40° C. | 850 | 11 | Mixed CuO and CuAl$_2$O$_4$ (43%) | 55 | 0.182 |
| 4 | Source: CuN + NaAl (+HNO$_3$) Method: Precipitation method, Simultaneous, RT 40° C. | 1000 | 11 | Mixed CuO and CuAl$_2$O$_4$ (95%) | 30 | 0.121 |

Example-2

Additive Preparation:

The Gasoline Sulfur Reduction (GSR) additives were prepared from Cu based spinel obtained from Batch 2 mentioned in example 1 as active support, different pore size alumina as matrix component and clay as filer/provides mechanical strength to catalyst. The additive composition was spinel (10-30%): Alumina (20-40%): Clay (40-60%). The additive was prepared by following steps:

Step 1:

The commercial alumina having different properties is employed in the additive preparation and the properties are shown in the Table 3.

TABLE 3

Properties of alumina

| S. No. | Description | Surface area (m$^2$/g) | Pore volume (m$^3$/g) | Pore size distribution (Å) | Total Acidity mmol/gm |
|---|---|---|---|---|---|
| 1. | Alumina-1 | 350 | 0.44 | 82% <50 Å APD = 41 Å | 0.348 |
| 2. | Alumina-2 | 275 | 0.84 | 4% (<50 Å), 51% (50-100 Å), 22% (100-200 Å), 23 (<200 Å) APD = 93 Å | 0.291 |
| 3. | Alumina-3 | 34 | 0.21 | 76% >200 Å APD = 165 Å | 0.093 |

The acidic alumina having high acidity has APD of 41-165 Å is responsible for optimum interaction of free weak basic CuO (52%) to form the final additive having pore size more than 200 Å.

Appropriate amount of alumina 1, alumina 2 and alumina 3 and clay were milled together for 2 hours. Obtained clay-alumina slurry was peptized with formic acid (85%). The slurry was mixed thoroughly for 1 h.

Step 2:

Required amount of spinel materials obtained from Experiments 1, 2 and 3 were added to clay-alumina slurry and stirred for homogenization for 30 minutes. pH of the final slurry is in the range of 3-4.

Step 3:

The final slurry was spray dried with inlet temperature 370° C., out let temperature 150° C., the microsphere having dimension of 45-300μ, was subjected to calcinations at 550° C. for 2 hr.

Table 4 shows the composition of the gasoline sulfur reduction additive and its properties such as surface area, pore volume, apparent bulk density and pore diameter. The prepared additive has shown bi model pore in the range of 20 Å-200 Å and 201-400 Å (FIG. 1). Additive 1 has the highest percentage of pore in the range 20 Å-200 Å i.e. 41.7 and Additive 3 has the highest percentage of pore in the range of 201-400 Å i.e. 73.6.

TABLE 4

Properties of Additive prepared:

| Preparation | Alumina | Spinel | Clay | Properties of additive |
|---|---|---|---|---|
| Additive-1 | Commercial Alumina-1 (20%) SA = 380 m$^2$/gm Avg Pore Dia = 41 Å PV = 0.3798 cm$^3$/gm | Spinel-2 from the Batch 2 of Example 1 (30%) | 50% | SA = 40 m$^2$/gm Pore Dia Å: 20-200 = 41.7 201-400 = 58.3 PV = 0.204 cm$^3$/gm ABD = 0.84 gm/cc Total Acidity = 0.432 mmol/gm |
| Additive-2 | Commercial Alumina-2 (20%) SA = 354.9 m$^2$/gm Avg Pore Dia = 93 Å PV = 0.8239 cm$^3$/gm | Spinel-2 from the Batch 2 of Example 1 (30%) | 50% | SA = 43 m$^2$/gm Pore Dia Å: 20-200 = 39.6 201-400 = 60.4 PV = 0.236 cm$^3$/gm ABD = 0.74 gm/cc Total Acidity = 0.332 mmol/gm |

TABLE 4-continued

Properties of Additive prepared:

| Preparation | Alumina | Spinel | Clay | Properties of additive |
|---|---|---|---|---|
| Additive-3 | Commercial Alumina-3 (20%) SA = 47.72 m$^2$/gm Avg Pore Dia = 165 Å PV = 0.197 cm$^3$/gm | Spinel-2 from the Batch 2 of Example 1 (30%) | 50% | SA = 26 m$^2$/gm Pore Dia Å: 20-200 = 26.4 201-400 = 73.6 PV = 0.149 cm$^3$/gm ABD = 0.75 gm/cc Total Acidity = 0.171 mmol/gm |

Example 3

Commercial FCC and RFCC catalyst were used to check the performance of the spinel based GSR additive. Before the micro activity test experiment the catalysts and additive were pretreated to simulate the hydrothermal deactivation, which occurs in a commercial regenerator.

Pretreatment of Fresh FCC and RFCC Catalyst and GSR Additives:

(i) The FCC catalyst was hydrothermally deactivated at 850° C. for 5 hrs and the additives were hydrothermally deactivated at 750° C. for 3 hrs without metal.

(ii) The RFCC catalyst and additive sample were impregnated with 2500 ppm nickel and 7000 ppm vanadium by Mitchell method as per the procedure mentioned in "B. R. Mitchell, Ind. Eng. Chem. Prod. Res. Dev. 19 (1980) 209-213, Title: Metal Contamination of Cracking Catalysts. 1. Synthetic Metals Deposition on Fresh Catalysts". The RFCC catalyst and additive were impregnated with a required volume of the impregnation solution that was double the pore volume of the catalysts. The excess solvent was removed in a rotary evaporator at 80° C. The remaining organics were burned off with air at 150° C. for 3 h followed by calcinations for 550° C. for 1 h. Hydro thermal deactivation was carried out at 788° C. temperature for 3 hrs for catalyst and 750° C. temperature for 3 hrs for additive sample.

Example 4

Simulated MAT Experiment and Product Characterization:

The activity measurement for base catalyst and additive samples (10 wt % concentration) was done using advanced cracking evaluation resid (ACE R+) MAT unit supplied by M/s. Kayser technologies, USA. The experiments were carried out at the catalyst/oil ratio of 4.5, 6.0 and 7.5 by varying the amount of catalyst loading (with and without additive) at a constant feed rate and feed injection time. The feed injection time was such; it minimized the effect of time averaging on yields because of catalyst deactivation due to the formation of coke. Reactor operating temperature was maintained close to the riser outlet temperature in the commercial plant (i.e. 510° C.). After the completion of the reaction, the catalyst was stripped with nitrogen to remove adsorbed reaction products. Coke on the catalyst was determined by in-situ regeneration at about 650° C. by fluidizing with air. The gaseous sample was analyzed, online, by M/s. Agilent micro gas chromatography analyzer. The H$_2$, C$_1$, C$_2$, C$_3$, C$_4$, and C$_5$ lump were determined quantitatively. The liquid products were diluted in the CS$_2$ solvent and analyzed in a simulated distillation analyzer (Make and Model—Perkin Elmer Clarus 500 gas chromatography). The percentage of the liquid products boiling in the range of gasoline (C5-150° C.), heavy naphtha (C150-216° C.), light cycle oil (C-216-370° C.) and clarified oil (370° C.+) were calculated.

Carbon content of the catalyst was determined by online IR analyzer (Make and Model—Servomex 1440).

The collected product samples were analyzed for the presence of sulfur in Analytical Control's high-temperature carbon-nitrogen-sulfur simulated distillation (HT CNS SIM-DIST) analyzer with Agilent 7890B gas chromatography. The paraffin, olefins, naphthenes, and aromatics (PONA) analysis and RON of the product samples were analyzed in Analytical Control's built-in custom paraffin, iso-paraffins, olefins, naphthenes and aromatics (PIONA) pre-fractionator M3 reformulyzer analyzer with Agilent's 7890 gas chromatography.

Example 4A

Figure 2:
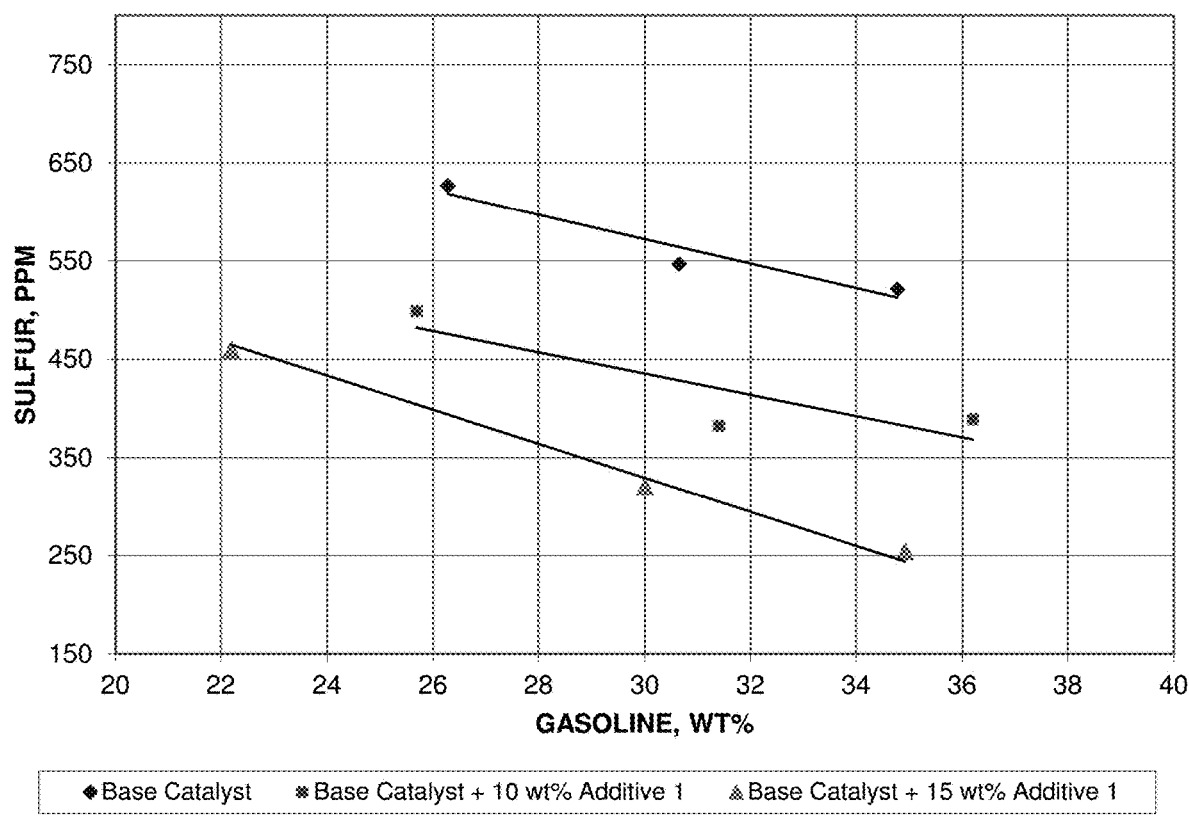
FIG. 2 illustrates the gasoline yield vis-à-vis amount of sulfur with base catalyst and base catalyst with additive-1 (10 wt % concentration and 15 wt % concentration)

The cracking experiment with base catalyst and base catalyst along with additive 1 (10 & 15 wt % concentration) and feedstock-1 at FCC condition is given in Table 5. The experiments were conducted at three different Cat/Oil. The yields and sulfur reduction of base catalyst and base catalyst along with additive were calculated at the constant conversion of 59.67 wt %. FIG. 2 indicates the gasoline yield vis-à-vis amount of sulfur with base catalyst and base catalyst with additive (10 wt % concentration and 15 wt % concentration).

TABLE 5

Cracking experiment yields with feedstock-1 with additive 1 and Sulfur in product gasoline sample.

| Yields, wt % | Base | Base + 10% Additive 1 | Base + 15% Additive 1 |
|---|---|---|---|
| Dry gas | 1.42 | 1.45 | 1.6 |
| LPG | 16.72 | 15.86 | 16.45 |
| Gasoline (C5 = 150° C.) | 28.83 | 29.04 | 28.65 |
| Heavy Naphtha (150-216° C.) | 7.33 | 7.86 | 7.49 |
| Light Cycle Oil (216-370° C.) | 22.79 | 23.3 | 23.44 |
| Clarified Oil (216-370° C.) | 17.54 | 17.04 | 16.89 |
| Coke | 5.37 | 5.45 | 5.48 |
| Conversion, wt % | 59.67 | 59.66 | 59.67 |
| Sulfur in gasoline, ppm | 585 | 443 | 393 |
| % Sulfur Reduction | — | 24.36 | 32.76 |

The additive A with Pore Diameter in the range of <20 Å-200 Å range has highest percentage 41.7%, which could able to remove sulfur in gasoline from 585 ppm to 443 ppm with 10 wt % additive concentration and from 585 ppm to 393 ppm with 15 wt % additive concentration. At −216° C. conversion of 59.67 wt % the selectivity of gasoline is high when the additive concentration is 10 wt %. Because of the large pore alumina matrix in the additive preparation could able to reduce the clarified yield from 17.54 wt % to 17.04 wt % and 16.89 wt %.

Example 4B

The cracking experiment with base catalyst and base catalyst along with 10 wt % additive concentration (Additive 1, Additive 2 and Additive 3) and feedstock-1 at RFCC condition is given in Table 6.

TABLE 6

Cracking experiment yields with feedstock 2 with Additive 1,
Additive 2 and Additive 3 and Sulfur in product gasoline sample.

| Metal Level | | | | |
|---|---|---|---|---|
| Nickel, ppm | 2500 | 2500 | 2500 | 2500 |
| Vanadium, ppm | 7000 | 7000 | 7000 | 7000 |

| Yields, wt % | Base | Base + 10% Additive 1 | Base + 10% Additive 2 | Base + 10% Additive 3 |
|---|---|---|---|---|
| Drygas | 2.52 | 2.53 | 2.53 | 2.47 |
| LPG | 15.71 | 15.11 | 15.01 | 14.91 |
| Gasoline (C5 = 150° C.) | 23.98 | 23.68 | 23.47 | 23.56 |
| Heavy Naphtha (150-216° C.) | 6.65 | 6.54 | 6.75 | 6.89 |
| Light Cycle Oil (216-370° C.) | 23.99 | 25.05 | 24.80 | 24.53 |
| Clarified Oil (216-370° C.) | 19.07 | 18.01 | 18.26 | 18.53 |
| Coke | 8.08 | 9.08 | 9.18 | 9.11 |
| Conversion, wt % | 56.94 | 56.94 | 56.94 | 56.94 |
| Sulfur in gasoline, ppm | 1397 | 688 | 1018 | 1183 |
| % Sulfur Reduction | — | 50.74 | 27.14 | 15.32 |
| RON | 91.2 | 92.1 | 91.7 | 91.9 |

The additive having highest percentage in the 20 Å-200 Å pore diameter helped to reduce the sulfur in the gasoline range molecule. Additive 1 has produces lowest sulfur in gasoline i.e. 688 ppm. The gasoline selectivity is maintained in the same range for all the additives. Because of the large pore alumina matrix in the formulation helped to maintain the similar selectivities even after the main catalyst diluted with 10 wt % additive concentration. Further it also helped to reduce the clarified oil yield of base catalyst from 19.07 wt % to 18.01 wt % (Additive 1), 18.26 wt % (Additive 2) and 18.53 wt % (Additive 3).

Figure 3:
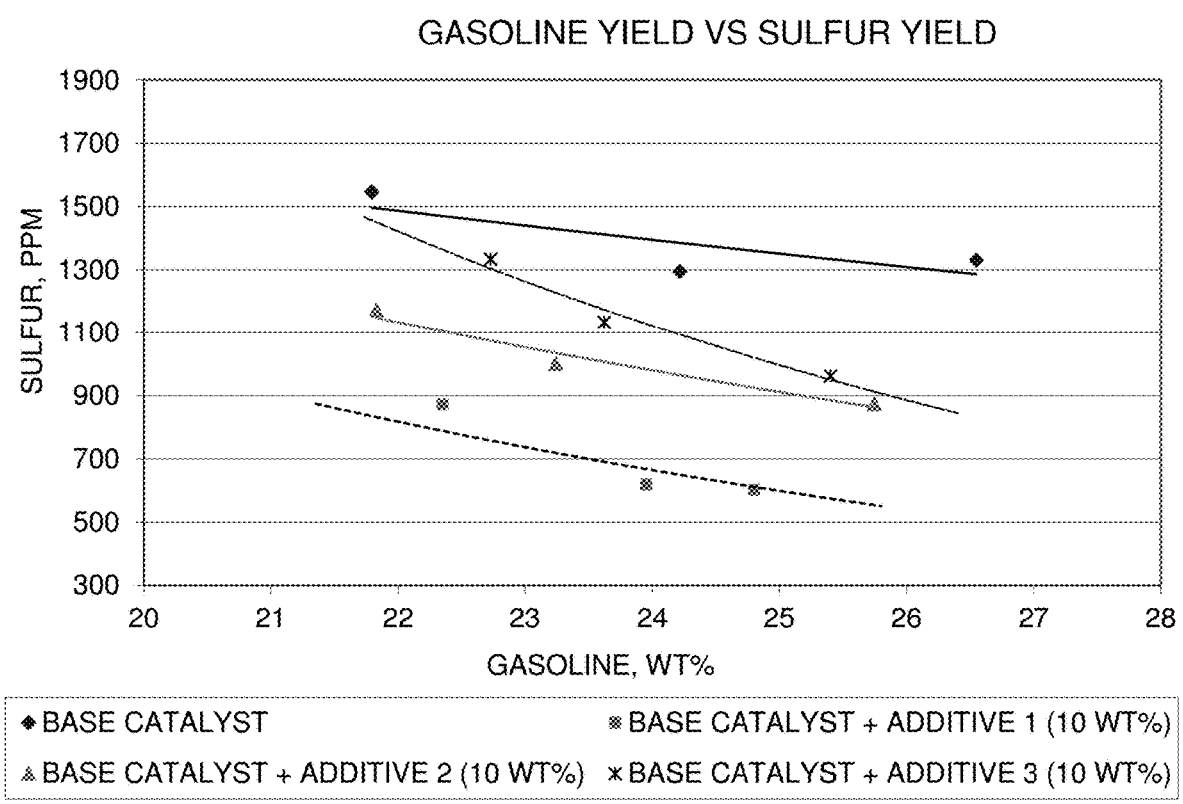
FIG. 3 illustrates the gasoline yield vis-à-vis amount of sulfur with base catalyst and base catalyst with Additive 1, Additive 2 and Additive 3 (10 wt % concentration)

FIG. 3 indicates the gasoline yield vis-à-vis amount of sulfur with base catalyst and base catalyst with Additive 1, Additive 2 and Additive 3 (10 wt % concentration).

Further it also helped to increase the octane number of base catalyst from 91.2 wt % to 92.1 wt % (Additive 1), 91.7 wt % (Additive 2) and 91.9 wt % (Additive 3).

The invention claimed is:

1. A gasoline sulfur reduction (GSR) additive, the additive comprising:
   10-30 wt. % of a copper aluminate spinel;
   20-40 wt. % of an acidic alumina matrix; and
   40-60 wt. % of a clay, and the wt. % being based on the total weight of the additive, wherein the additive has a bimodal pore distribution with 55-75% of total pores having a large pore diameter in the range of 200 to 400 Å and 25-45% of total pores having a mesoporous pore diameter in the range of 20-200 Å.

2. The additive as claimed in claim 1, wherein the copper aluminate spinel has a surface area in the range of 30-85 m$^2$/gm and a total acidity in the range of 0.121-0.232 mmol/gm.

3. The additive as claimed in claim 1, wherein the acidic alumina matrix has a surface area in the range of 34-380 m$^2$/gm, a total acidity in the range of 0.093-0.348 mmol/gm and a pore volume in the range of 0.19-0.82 cm$^3$/gm.

4. The additive as claimed in claim 1, wherein the clay is selected from kaolinite, bentonite, illite, vermiculite, smectite, dolomite, or a combination thereof.

5. The additive as claimed in claim 1, wherein the additive has a total acidity in the range of 0.171-0.432 mmol/gm, a surface area in the range of 26 to 43 m$^2$/gm, a pore volume in the range of 0.15 to 0.24 cm$^3$/gm and an ABD in the range of 0.74 to 0.84 gm/cm$^3$.

6. A process for preparing the gasoline sulfur reduction (GSR) additive as claimed in claim 1, the process comprising:
   i. milling 20-40 wt. % of alumina and 40-60 wt. % of the clay to obtain a clay-alumina slurry;
   ii. peptizing the clay-alumina slurry with an acid to obtain a peptized clay-alumina slurry;
   iii. adding 10-30 wt. % of the copper aluminate spinel to the peptized clay-alumina slurry and stirring the same for homogenization to obtain a final slurry;
   iv. spray drying the final slurry of step (iii) to obtain microspheres having a dimension in the range of 20-300 micron and an ABD greater than 0.74 gm/cm$^3$; and
   v. calcining the microspheres to obtain the gasoline sulfur reduction (GSR) additive.

7. The process as claimed in claim 6, wherein the acid is selected from formic acid and nitric acid.

8. The process as claimed in claim 6, wherein the copper aluminate spinel of step (iii) is prepared by a co-precipitation method either by a sequential addition or a simultaneous addition.

9. The process as claimed in claim 6, wherein the final slurry of step (iii) has a pH in the range of 3-4.

10. The process as claimed in claim 6, wherein the spray drying of step (iv) is carried out with an inlet temperature of 300-400° C., and with an outlet temperature of 150-200° C. to obtain the microspheres having a dimension in the range of 45-300μ.

11. The process as claimed in claim 6, wherein the alumina has a pore size in the range of 20 to 400 Å.

12. The process as claimed in claim 6, wherein the copper aluminate spinel has a pore size in the range of 30 to 60 Å.

* * * * *